United States Patent
Hamaguchi et al.

(10) Patent No.: US 10,100,444 B2
(45) Date of Patent: Oct. 16, 2018

(54) YARN AND GLAND PACKING

(71) Applicant: Nippon Pillar Packing Co., Ltd., Osaka-shi, Osaka (JP)

(72) Inventors: Ryoji Hamaguchi, Osaka (JP); Hiroyoshi Nakamitsu, Osaka (JP)

(73) Assignee: NIPPON PILLAR PACKING CO., LTD., Osaka-Shi (JP)

( * ) Notice: Subject to any disclaimer, the term of this patent is extended or adjusted under 35 U.S.C. 154(b) by 0 days.

(21) Appl. No.: 15/526,500

(22) PCT Filed: Jul. 30, 2015

(86) PCT No.: PCT/JP2015/071650
§ 371 (c)(1),
(2) Date: May 12, 2017

(87) PCT Pub. No.: WO2016/080023
PCT Pub. Date: May 26, 2016

(65) Prior Publication Data
US 2017/0306535 A1    Oct. 26, 2017

(30) Foreign Application Priority Data

Nov. 18, 2014   (JP) .................................. 2014-233428
Nov. 18, 2014   (JP) .................................. 2014-233430

(51) Int. Cl.
*D04B 1/22*      (2006.01)
*F16J 15/22*     (2006.01)
(Continued)

(52) U.S. Cl.
CPC .............. *D04B 1/225* (2013.01); *C09K 3/10* (2013.01); *D02G 3/36* (2013.01); *D04B 1/22* (2013.01);
(Continued)

(58) Field of Classification Search
CPC ... D04B 1/225; C09K 3/10; D02G 3/36; F16J 15/22; D10B 2505/06
See application file for complete search history.

(56) References Cited

U.S. PATENT DOCUMENTS 4,949,620 A  *  8/1990  Swan ...................... D04C 1/12
                                                 277/537
5,419,568 A  *  5/1995  Champlin ................ D04C 1/12
                                                 277/529

(Continued)

FOREIGN PATENT DOCUMENTS

EP          1967625 A1     9/2008
JP          2007-138316    6/2007
(Continued)

OTHER PUBLICATIONS

International Search Report, dated Oct. 20, 2015 (dated Oct. 20, 2015), 2 pages.
European Search Report dated Jul. 9, 2018, 5 pages.

*Primary Examiner* — Gilbert Y Lee
(74) *Attorney, Agent, or Firm* — Rankin, Hill & Clark LLP

(57) ABSTRACT

A yarn in which slipping of filler materials from a tubular member can be reduced while suppressing the manufacturing cost is provided. The yarn has a tubular member, and a plurality of filler materials that are formed into a strip-like shape, and is configured by loading the filler materials into the tubular member in a state where the longitudinal directions of the filler materials are made extending along the axial direction of the tubular member. In the yarn, the tubular member is configured by using wire material that is knitted so as to produce stitches. The wire material has arcuate loop portions that define parts of external shapes of the stitches. In a state where the tubular member is developed, the loop portions are expanded in a direction that is inclined with
(Continued)

respect to a straight line that extends in the axial direction of the tubular member.

8 Claims, 13 Drawing Sheets

(51) Int. Cl.
*D02G 3/02* (2006.01)
*D02G 3/38* (2006.01)
*D07B 1/00* (2006.01)
*F16J 15/00* (2006.01)
*C09K 3/10* (2006.01)
*D02G 3/36* (2006.01)

(52) U.S. Cl.
CPC ............... *D07B 1/00* (2013.01); *F16J 15/00* (2013.01); *F16J 15/22* (2013.01); *D10B 2505/06* (2013.01)

(56) References Cited

U.S. PATENT DOCUMENTS

| | | | |
|---|---|---|---|
| 9,188,230 B2 * | 11/2015 | Kawasaki | F16J 15/182 |
| 2009/0108534 A1 | 4/2009 | Ueda | |
| 2013/0075978 A1 * | 3/2013 | Azibert | F16J 15/22 |
| | | | 277/529 |
| 2013/0307229 A1 * | 11/2013 | Veiga | F16J 15/104 |
| | | | 277/652 |
| 2014/0084546 A1 * | 3/2014 | Starbile | F16J 15/22 |
| | | | 277/308 |

FOREIGN PATENT DOCUMENTS

| | | |
|---|---|---|
| JP | 2007-191803 | 8/2007 |
| JP | 2007-191804 | 8/2007 |
| WO | 2007/083507 | 7/2007 |

* cited by examiner

YARN AND GLAND PACKING

TECHNICAL FIELD

The present invention relates to a yarn and a gland packing.

BACKGROUND ART

Conventionally, a fluid apparatus such as a pump or a valve is provided with a gland packing which is a shaft seal part. As such a gland packing, a product is used which is configured by twisting or braiding a plurality of bundled yarns. For example, a yarn disclosed in Patent Literature 1 is known as a yarn for such a gland packing.

As shown in FIG. 12, the yarn 101 includes a tubular member 103 which is formed by knitting a wire material (metal wire) 102, and further includes a plurality of expanded-graphite materials (filler materials) 104 which are formed into a strip-like shape. The yarn 101 is configured by loading the expanded-graphite materials 104 into the tubular member 103 in a state where the longitudinal directions of the expanded-graphite materials 104 are made extending along the axial direction of the tubular member 103.

In the yarn 101, the tubular member 103 is formed by knitting the wire material 102 with a plurality of knitting needles by a predetermined knitting machine. In order to perform knitting, the plurality of knitting needles are configured so as to repeat only a vertical motion at a predetermined position. Therefore, the tubular member 103 has first stitches 105 which are produced in accordance with the thickness of the knitting needles, and second stitches 106 which are produced in accordance with the distance between adjacent ones of the knitting needles.

As also shown in FIG. 13, the second stitches 106 are formed into gaps having an opening area which is larger than opening areas of the first stitches 105 with respect to the circumferential direction of the tubular member 103 (the smaller the number of the knitting needles, the larger the degree by which the second stitches 106 are larger than the first stitches 105). The second stitches 106 have a width (the dimension in the circumferential direction) which is larger than the width (the dimension in the short side direction) of the expanded-graphite materials 104, and are continuously placed so as to be arranged substantially in a row in the axial direction of the tubular member 103.

When the expanded-graphite materials 104 are loaded into the tubular member 103, therefore, the expanded-graphite materials 104 line up along the row of the second stitches 106 which are arranged in the axial direction of the tubular member 103, so that end portions 108 in the long side direction of the expanded-graphite materials 104 are easily exposed as a whole through the second stitches 106 to the outside of the tubular member 103. Consequently, there is a possibility that, in the vicinities of the end portions 108, a part of the expanded-graphite materials 104 easily slips off the tubular member 103 through the second stitches 106.

Furthermore, the tubular member 103 shows a polygonal shape (in the case where the number of the knitting needles is three, a triangular shape) in which a sectional shape perpendicular to the axial direction has an edge portion in the vicinity of the first stitch 105. In the case where a gland packing is configured by using the yarn 101, when a plurality of yarns (including the yarn 101) are crumpled for braiding or the like, therefore, for example, the expanded-graphite materials 104 of the yarn 101 are rubbed with other yarns through the second stitches 106, and therefore easily slip off the tubular member 103.

In the tubular member 103, when stitches (the first stitches 105 and the second stitches 106) which are produced by using the wire material 102 are made as small as possible, slipping of the expanded-graphite materials 104 from the tubular member 103 can be suppressed. When the stitches are simply made as small as possible, however, the rate of the wire material 102 in the tubular member 103 becomes excessively large, and there arises a problem that the manufacturing cost is increased.

PRIOR ART LITERATURE

Patent Literature

Patent Literature 1: Japanese Patent Application Laid-Open No. 2007-191803

SUMMARY OF THE INVENTION

Problems to be Solved by the Invention

The invention has been conducted in view of these circumstances. It is an object of the invention to provide a yarn in which slipping of filler materials from a tubular member can be reduced while suppressing the manufacturing cost, and a gland packing which uses the yarn.

Means for Solving the Problems

The invention according to claim 1 is a yarn which comprises a tubular member, and a plurality of filler materials that are formed into a strip-like shape, and in which the filler materials are loaded into the tubular member in a state where longitudinal directions of the filler materials are made extending along an axial direction of the tubular member, wherein the tubular member is configured by using a wire material which is knitted so as to produce stitches, the wire material has arcuate loop portions which define parts of external shapes of the stitches, and, in a state where the tubular member is developed, the loop portions are expanded in a direction which is inclined with respect to a straight line that extends in the axial direction of the tubular member.

According to the configuration, when the filler materials are loaded into the tubular member, the stitches are placed in a state where the stitches are inclined with respect to the filler materials, and end portions in the long side direction of the filler materials are hardly exposed as a whole through the stitches to the outside of the tubular member. In other words, parts of the end portions in the long side direction of the filler materials are easily covered by the wire material. In the case where members (for example, expanded-graphite materials) which are relatively brittle are employed as the filler materials, therefore, slipping of parts of the filler materials from the stitches to the outside of the tubular member can be suppressed. Moreover, the rate of the wire material in the tubular member can be suppressed, and therefore the manufacturing cost can be maintained to be as low as possible.

As set forth in claim 2, preferably, the stitches are made substantially uniform in size.

As set forth in claim 3, preferably, the stitches are placed continuously in the axial direction of the tubular member, and spirally about an axis of the tubular member.

As set forth in claim 4, more preferably, the tubular member is formed in such a manner that a sectional shape perpendicular to the axial direction of the tubular member is approximately circular.

According to the configuration, in the case where a gland packing or the like is to be configured by using a plurality of yarns including the yarn, when the plurality of yarns are crumpled for braiding or the like, for example, the filler materials of the yarn are hardly rubbed with other yarns through the stitches. Even in the case where the filler materials are relatively brittle, therefore, slipping of the filler materials can be suppressed. Moreover, the flexibility of the yarn can be improved, and the yarn can be easily bent.

As set forth in claim 5, preferably, the gland packing is configured into a string-like shape by twisting or braiding a plurality of bundled yarns, and the yarn according to any one of claims 1 to 4 is included in the plurality of yarns.

According to the configuration, the gland packing can be configured by using the yarn in which slipping of the filler materials from the tubular member can be reduced while suppressing the manufacturing cost. In this case, the plurality of yarns including the yarn can be braided as closely as possible, and the sealing property of the gland packing can be enhanced. In the case where the gland packing is to be manufactured, when the plurality of yarns are twisted or brained, powder dust which is produced from the filler materials of the yarn can be reduced, and the environment for manufacturing the gland packing can be cleaned.

Effects of the Invention

According to the invention, it is possible to provide a yarn in which slipping of filler materials from a tubular member can be reduced while suppressing the manufacturing cost, and a gland packing which uses the yarn.

MODE FOR CARRYING OUT THE INVENTION

An embodiment of the invention will be described with reference to the drawings.

Figure 1:
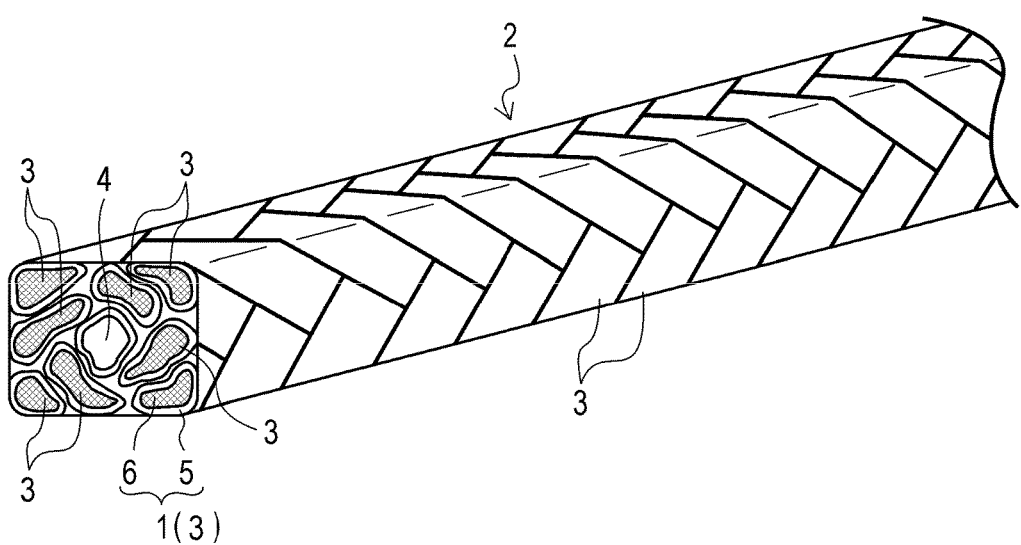
FIG. 1 is a perspective view of a gland packing including a yarn of an embodiment of the invention.

As shown in FIG. 1, for example, a yarn 1 of the embodiment of the invention is used for configuring a gland packing 2. The use of the yarn 1 is not limited to the gland packing 2, and the yarn can be used for configuring a gland packing having a mode which is different from the gland packing 2, a string gasket, refractory cloth, or the like.

The gland packing 2 is configured into a string-like shape by bundling a plurality of yarns 3 including the yarn 1 around a core member 4, and then twisting or braiding these yarns. The gland packing 2 may include the yarn 1 in the plurality of yarns 3, but preferably all of the plurality of yarns 3 may be the yarns 1.

Figure 2:
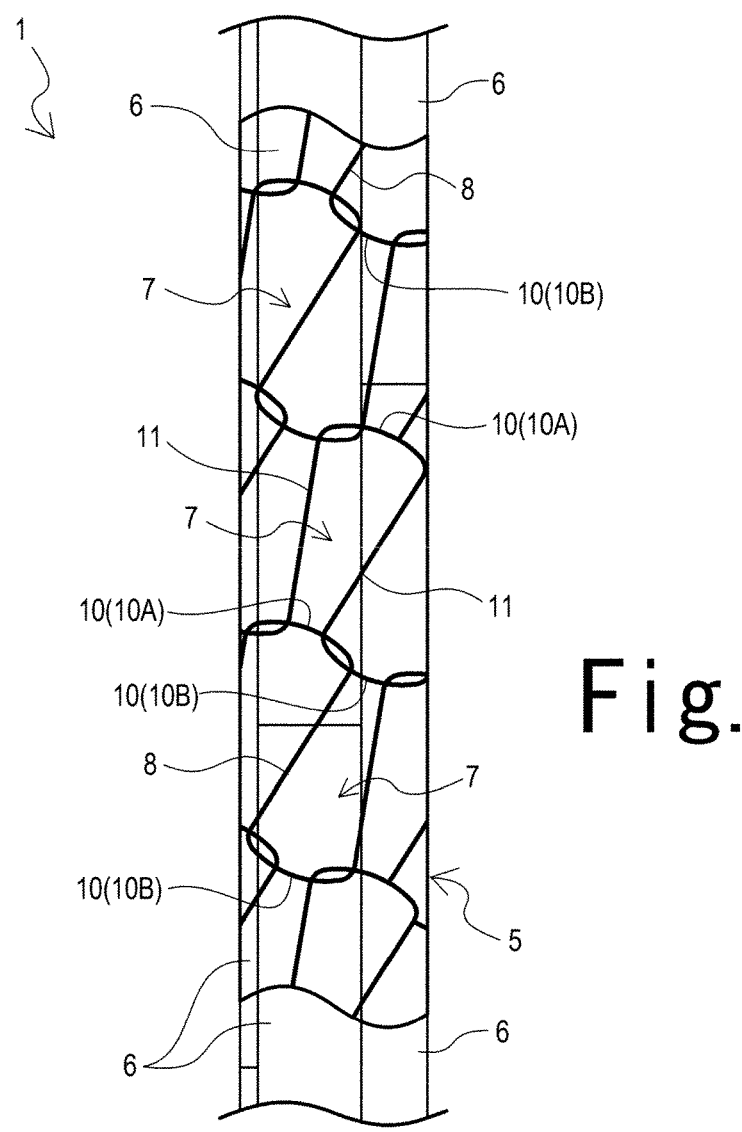
FIG. 2 is a partial front view of the yarn in FIG. 1.

As shown in FIG. 2, the yarn 1 includes a tubular member 5, and a plurality of filler materials 6. The filler materials 6 are formed into a strip-like shape so as to be able to be accommodated in the tubular member 5. The yarn 1 is configured by loading the filler materials 6 into the tubular member 5 in a state where the longitudinal directions of the filler materials 6 are made extending along the axial direction of the tubular member 5.

Figure 3:
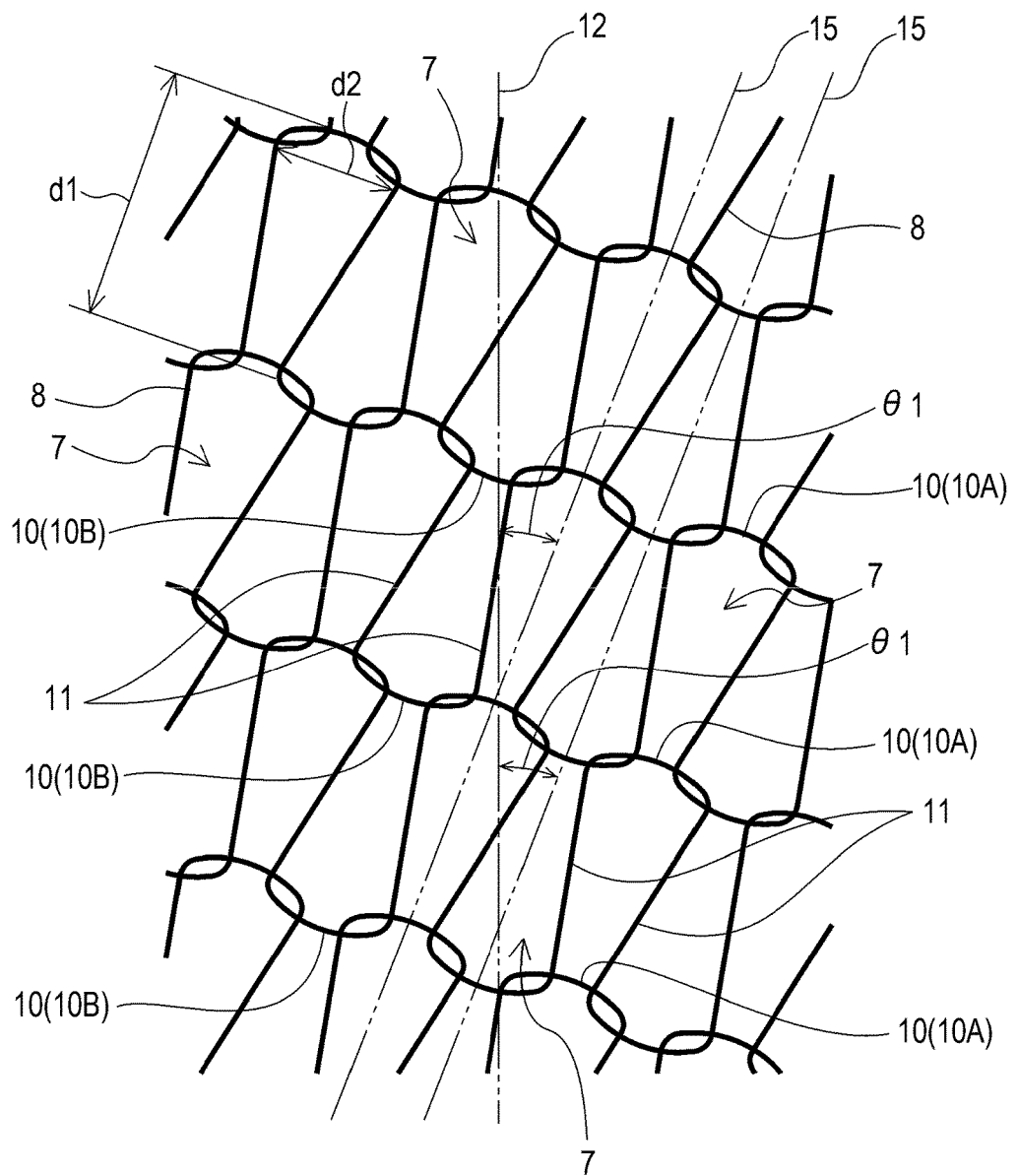
FIG. 3 is a partial development view of a tubular member in the yarn of FIG. 2.

In the thus configured yarn 1, the tubular member 5 is configured by using a wire material 8 which is knitted so as to produce stitches 7. The wire material 8 has arcuate loop portions 10 which define parts of the external shapes of the stitches 7. In the state where the tubular member 5 is developed, as shown in FIG. 3, the loop portions 10 are expanded in a direction which is inclined with respect to a straight line 12 that extends in the axial direction of the tubular member 5.

In the embodiment, as the filler materials 6 which can be accommodated in the tubular member 5, expanded-graphite materials are employed. Specifically, each of the filler materials 6 is an expanded-graphite material which is formed into a strip-like (rectangular) shape having, for example, a length (the dimension in the longitudinal direction) of about 100 to 300 mm (preferably, 150 to 250 mm), a width (the dimension in the short side direction) of about 0.5 to 2.5 mm (preferably, 0.5 to 1.5 mm), and a thickness of about 0.2 to 1.0 mm (preferably, 0.3 to 0.8 mm).

As the wire material 8 constituting the tubular member 5, a metal wire such as an Inconel wire or a stainless steel wire may be employed. Specifically, the wire material 8 may be a round wire having, for example, a diameter of about 0.1 mm.

The wire material 8 is knitted to form the loop portions 10 and extended portions 11. The wire material 8 is caused to form one of the stitches 7 by placing the loop portions 10 so as to be opposed to each other approximately in the axial direction of the tubular member 5, placing the extended portions 11 so as to be opposed to each other approximately in the circumferential direction of the tubular member 5, and then connecting together these portions.

The loop portion 10 is placed, while integrally continuing with the extended portion 11 that cooperates with the loop portion to form the stitch 7, so as to be adjacent to the other loop portion 10 in which the convex direction is opposite, and which forms the other stitch 7, approximately in the circumferential direction of the tubular member 5. The extended portion 11 is placed so as to be adjacent to the other extended portion 11 which forms the further stitch 7, approximately in the axial direction of the tubular member 5.

In the tubular member 5, in this way, the stitches 7 that are produced by using the loop portions 10(10A) in which the convex direction is oriented in one direction, and the stitches 7 that are produced by using the loop portions 10(10B) in which the convex direction is opposite to the convex direction of the loop portions 10(10A) are arranged alternately with respect to approximately the circumferential direction of the tubular member 5, while being arranged in respective rows with respect to approximately the axial direction of the tubular member 5.

In the embodiment, the loop portions 10 are formed into a shape (arcuate shape) which is bent so as to be convex toward the outside of the outer circumference of the stitch 7. The extended portions 11 which are opposed to each other in order to produce the stitch 7 are extended so that the gap between the portions is gradually reduced as further advancing from one of the opposing loop portions 10 toward the other loop portion 10. According to the configuration, the external shape of the stitch 7 is formed as a gap having a shape which is obtained by cutting a part of a sector form.

Specifically, here, each of the stitches 7 is formed as a gap having, for example, a length (the dimension in the longitudinal direction) d1 of about 2 to 5 mm (preferably, 3 to 4 mm, and more preferably 3.3 to 3.6 mm), and a width (the dimension in the short side direction) d2 of about 0.7 to 2 mm (preferably, 1.2 to 1.5) mm (see FIG. 3).

That is, each of the stitches 7 has a width which is approximately equal to or smaller than the width of the filler material 6.

As shown in FIG. 3, moreover, the loop portions 10 are formed so as to, in the case where the tubular member 5 is developed into a flat shape, be convex in a direction which is inclined with respect to the virtual straight line 12 that extends in the axial direction of the tubular member 5. Also the extended portions 11 are formed so as to be extended in directions which are inclined with respect to the straight line 12. Therefore, the stitches 7 are produced so as to have a shape which is inclined with respect to the straight line 12.

For further details, the stitch 7 has an inclined shape in which the stitch 7 is extended so that a virtual straight line 15 connecting the most projected vertexes (most expanded positions) of the loop portions 10(10A), 10(10B) which are opposed to each other in order to form the stitch 7 forms an angle θ1 in a range of 5 to 45° with respect to the straight line 12 (see FIG. 3). Preferably, the angle θ1 formed by the straight line 15 and the straight line 12 is an angle in a range of 20 to 30°.

In the yarn 1, the filler materials 6 are loaded into the tubular member 5 so as to extend in the axial direction of the tubular member 5 without being twisted and while being linearly held. In the loading into the tubular member 5, the filler material 6 is put into the tubular member 5 so that the position of a longitudinal end portion of the filler material is misaligned from that of a longitudinal end portion of the other adjacent filler material 6, in the axial direction of the tubular member 5.

According to the above-described configuration, when the filler materials 6 are loaded into the tubular member 5, the filler materials 6 are placed in the state where the stitches 7 are inclined with respect to the filler materials 6, and the longitudinal end portions of the filler materials 6 are difficult as a whole to be exposed to the outside of the tubular member 5. In other words, parts of the longitudinal end portions of the filler materials 6 are easily covered by the wire material 8.

In the case where a material (for example, expanded-graphite materials as in the embodiment) which is relatively brittle is employed as the filler materials 6, therefore, slipping of parts of the filler materials 6 from the stitches 7 to the outside of the tubular member 5 can be suppressed. Moreover, the rate of the wire material 8 in the tubular member 5 can be suppressed, and therefore the manufacturing cost can be maintained to be as low as possible.

Consequently, the gland packing 2 can be configured by using the yarn 1 in which slipping of the filler materials 6 from the tubular member 5 can be reduced while suppressing the manufacturing cost. In this case, the plurality of yarns 3 including the yarn 1 are braided as closely as possible, and the sealing property of the gland packing 2 can be enhanced. In the case where the gland packing 2 is to be manufactured, when the plurality of yarns 3 are twisted or brained, powder dust which is produced from the filler materials 6 of the yarn 1 can be reduced, and the environment for manufacturing the gland packing 2 can be cleaned.

As shown in FIGS. 2 and 3, in the tubular member 5, preferably, the stitches 7 are approximately uniform in size in the whole tubular member 5. That is, the stitch 7 is produced by the wire material 8 so as to be formed as a gap having an approximately same opening area as the other stitches 7. In this case, the stitches 7 are placed so as to be approximately uniform in the whole tubular member 5.

As shown in FIG. 2, preferably, the stitches 7 are placed continuously and spirally about the axis of the tubular member 5 in the axial direction of the tubular member. In the case where the tubular member 5 is developed into a flat shape, as shown in FIG. 3, the stitches 7 are arranged on the respective plurality of straight lines 15 which are placed at predetermined intervals in substantially parallel, in the same direction and in a row, and placed so as to be adjacent to the other stitches 7 which are changed in a direction, in a direction that is substantially perpendicular to the straight lines 15.

Figure 4:
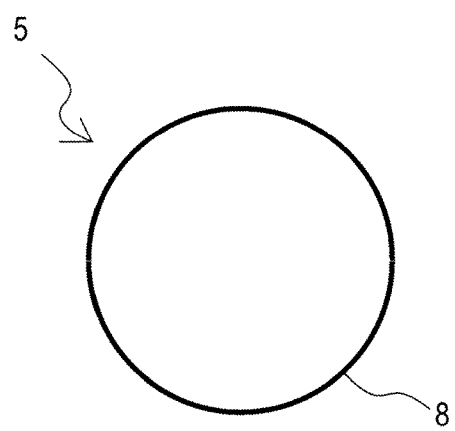
FIG. 4 is a sectional view perpendicular to the axial direction of the tubular member in the yarn of FIG. 2.

In the embodiment, as shown in FIG. 4, the sectional shape of the tubular member 5 which is perpendicular to the axial direction of the member is substantially circular.

According to the configuration, in the case where the the gland packing 2 is configured by using a plurality of yarns 3 including the yarn 1, when the plurality of yarns 3 are crumpled for braiding or the like, for example, the filler materials 6 of the yarn 1 are more hardly rubbed with the other yarns 3 through the stitches 7. Even in the case where the filler materials 6 are relatively brittle, therefore, slipping of the filler materials 6 can be suppressed. Moreover, the flexibility of the yarn 1 can be improved, and the yarn 1 can be easily bent.

Next, a method of manufacturing the yarn 1 will be described.

The method of manufacturing the yarn 1 includes a conveying step, a cutting step, and a loading step. The loading step has a knitting step, a guiding step, and a charging step.

The conveying step is a step of, in order to perform continuous supplying, conveying a sheet-like member having a predetermined width, to the cutting step. The sheet-like member functions as the raw material of the filler materials 6. Since expanded-graphite materials are used as the filler materials 6 in the embodiment, specifically, the sheet-like member is a belt-like expanded-graphite sheet.

The cutting step is a step of, in order to form small-width cut pieces, i.e., the strip-like filler materials 6, successively cutting the sheet-like member which is conveyed in the execution of the conveying step, in the width direction thereof (the direction perpendicular to the conveying direction). In the cutting step, the filler material 6 is newly formed in every predetermined time interval, and the formed filler materials 6 are sequentially supplied to the loading step (the guiding step).

In the loading step, the knitting step is a step of, in order to form the tubular member 5, knitting the wire material 8. The guiding step is a step of guiding the filler materials 6 which are formed into a strip-like shape, toward the opening of the tubular member 5. The charging step is a step of, in order to load the filler materials 6 into the tubular member 5, sequentially charging the filler materials 6 which are guided to the opening, into the tubular member 5 through the opening in a middle stage of the formation of the tubular member 5, in a state where the longitudinal directions of the filler materials 6 extend in the axial direction of the tubular member.

In the knitting step, knitting of the wire material 8 is advanced by a plurality of knitting needles which are placed substantially concentrically about the rotation axis, while revolvingly moving the knitting needles about the rotation axis. When the stitch 7 is to be formed by the wire material 8, the wire material 8 is prepared so that the arcuate loop portion 10 which defines a part of the external shape of the stitch 7 is expanded in a direction which, in a state where the tubular member 5 is developed, is inclined with respect to the straight line 12 that extends in the axial direction of the tubular member 5.

Figure 5:
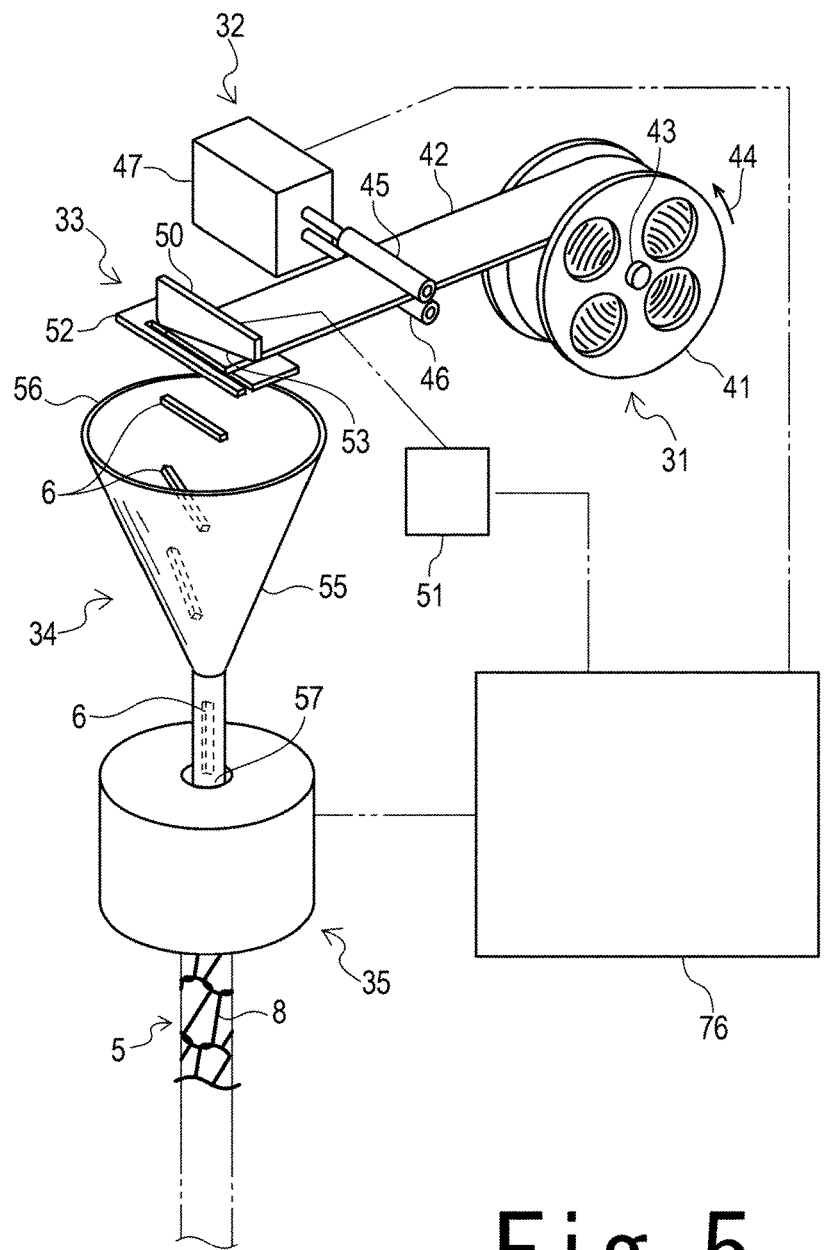
FIG. 5 is a diagram showing an example of a manufacturing apparatus for manufacturing the yarn of FIG. 2.

The method of producing the yarn 1 may be performed by using, for example, a manufacturing apparatus 30 shown in FIG. 5.

The manufacturing apparatus 30 includes a supplying mechanism 31, a conveying mechanism 32, a cutting mechanism 33, a guiding and supplying mechanism 34, and a knitting machine 35.

The supplying mechanism 31 includes a reel 41. The reel 41 is configured so that a sheet-like member (belt-like expanded-graphite sheet) 42 having a predetermined width can be wound around the reel 41, and disposed so as to be rotatable about a rotation shaft 43. The sheet-like member 42 which is wound around the reel 41 is gradually unwound by the rotation of the reel 41 in the direction of the arrow 44 shown in FIG. 5.

The conveying mechanism 32 includes a pair of rollers 45, 46 and a conveyance driving unit 47. The pair of rollers 45, 46 are configured so as to be able to clamp a part of the sheet-like member 42 which is unwound by the supplying mechanism 31. The conveyance driving unit 47 is configured so as to rotate at least one of the pair of rollers 45, 46.

In the conveying mechanism 32, the pair of rollers 45, 46 are configured so that, when at least one of the rollers is rotated by the conveyance driving unit 47, the rollers 45, 46 can pull a part of the sheet-like member 42 which is clamped by them, and feed the sheet-like member 42 which is unwound from the reel 41, toward the cutting mechanism 33.

The cutting mechanism 33 includes a cutting blade 50, a cutting driving unit 51, and a receiving table 52. The cutting blade 50 is configured so as to be able to cut the sheet-like member 42 in a plane which is substantially perpendicular to the conveying direction of the sheet-like member 42. The cutting driving unit 51 is configured so as to reciprocate the cutting blade 50 in directions in which the blade approaches and separates from the sheet-like member 42. The receiving table 52 is placed so as to be paired with the cutting blade 50.

The cutting blade 50 has a blade edge 53 which is angled with respect to the sheet surface of the sheet-like member 42. When the cutting blade 50 is moved by the cutting driving unit 51 in the direction in which the blade approaches the sheet surface of the sheet-like member 42, therefore, the cutting blade 50 can sequentially cut the sheet-like member 42 from one width-direction end to the other end, in order to form the filler materials 6.

The guiding and supplying mechanism 34 includes a funnel 55. The funnel 55 has a large-diameter upper end opening 56 and a lower end opening 57 having a diameter which is smaller than the diameter of the upper end opening 56. In order to enable the filler materials 6 formed by the cutting mechanism 33 to be guided to the upper end opening 56, the funnel 55 is disposed below the receiving table 52 in a state where the upper end opening 56 is upwardly opened, and the lower end opening 57 is downwardly opened.

The knitting machine 35 is configured so as to be able to knit the wire material 8 to form the tubular member 5. The knitting machine 35 continues to knit the wire material 8 so that the opening of the tubular member 5 is held at a position which is opposed to the lower end opening 57 of the funnel 55, and, while forming a tubular portion (a part of the tubular member 5), downwardly feeds the portion, thereby shaping the tubular member 5 in which the axial length has a predetermined dimension.

Figure 6:
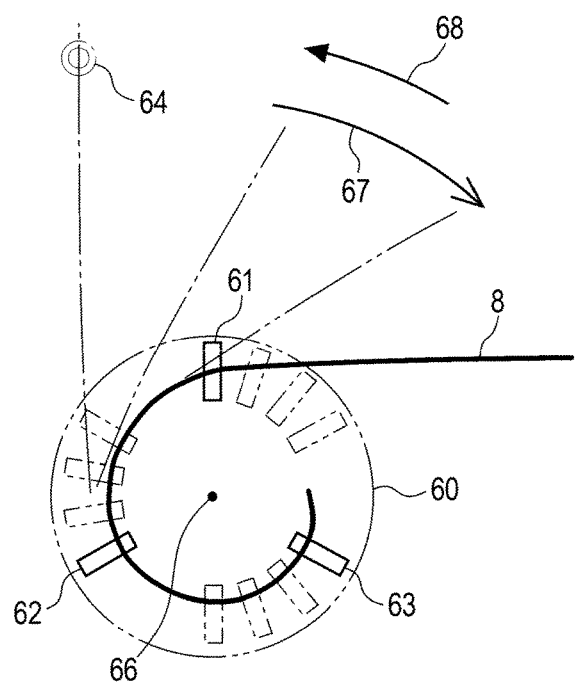
FIG. 6 is a plan diagram showing a part of a knitting machine in the manufacturing apparatus of FIG. 5.
Figure 7:
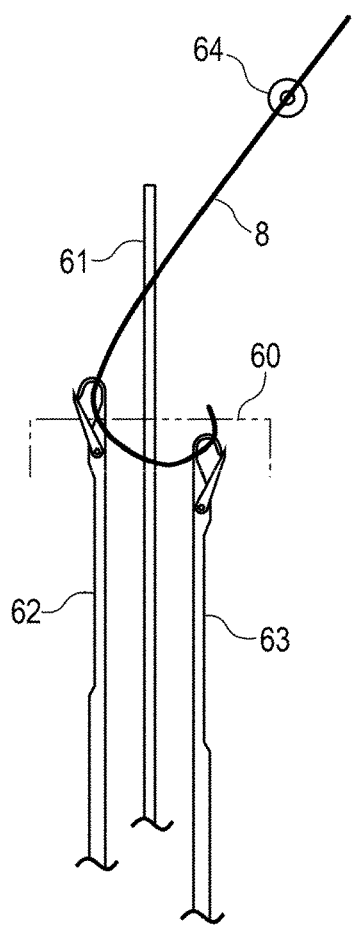
FIG. 7 is a side diagram showing a part of the knitting machine in the manufacturing apparatus of FIG. 5.

As shown in FIGS. 6 and 7, for further details, the knitting machine 35 includes a rotation table 60, a plurality (here, three) of knitting needles 61, 62, 63, and a guiding member 64. The rotation table 60 is configured so as to be drivingly rotated about a rotation axis 66 at a predetermined constant rotational speed. The guiding member 64 is disposed so as to be able to sequentially guide the wire material 8 to the knitting needles 61, 62, 63 while revolving the wire material in the direction of an arrow 67 shown in FIG. 6.

The plurality of knitting needles 61, 62, 63 are supported by the rotation table 60 in a vertically movable manner, and placed substantially concentrically about the rotation axis 66 at approximately regular intervals. In order to knit (circular knitting) the wire material 8, while being adequately vertically moved, the plurality of knitting needles 61, 62, 63 are revolvingly moved by the rotation of the rotation table 60, about the rotation axis 66 in the direction of an arrow 68 shown in FIG. 6.

Here, attention is focused on the movement of one of the plurality of knitting needles 61, 62, 63. The knitting of the wire material 8 is advanced as shown, for example, in FIG. 8.

Figure 8:
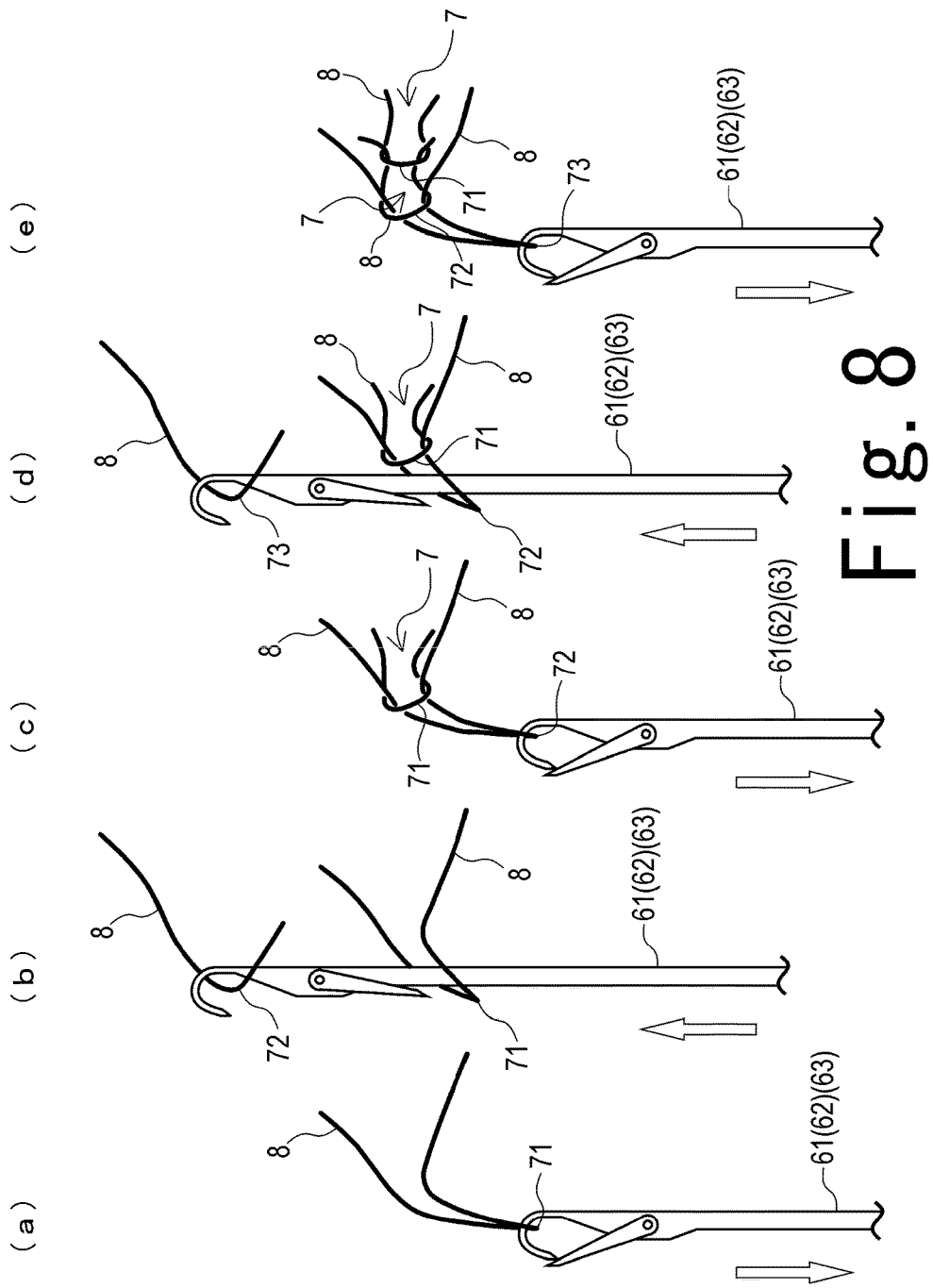
FIG. 8 is a diagram showing the flow of knitting, (a) is a view showing a first step, (b) is a view showing a second step, (c) is a view showing a third step, (d) is a view showing a fourth step, and (e) is a view showing a fifth step.
Figure 9:
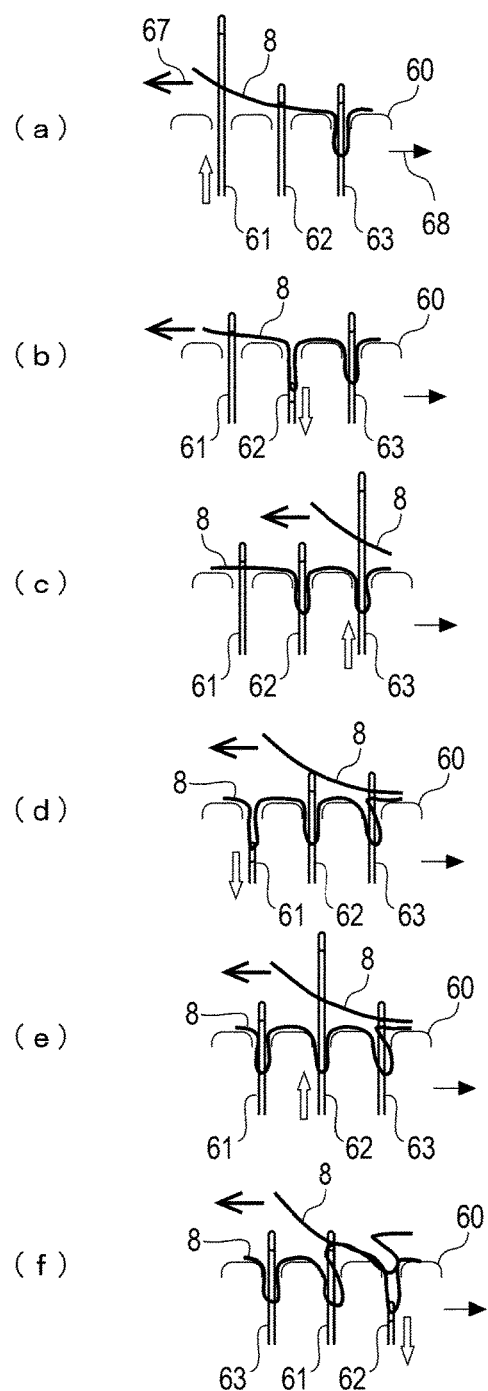
FIG. 9 is a schematic development view showing a flow in one rotation of a wire material when knitting is performed in the manufacturing apparatus of FIG. 5, (a) is a view showing a first step, (b) is a view showing a second step, (c) is a view showing a third step, (d) is a view showing a fourth step, (e) is a view showing a fifth step, and (f) is a view showing a sixth step.
Figure 10:
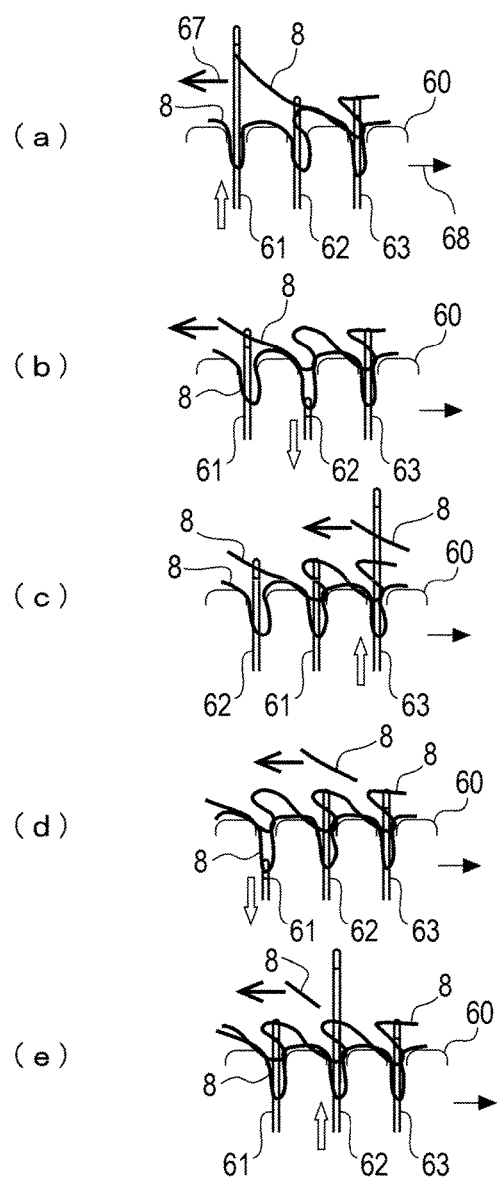
FIG. 10 is a schematic development view showing a flow in a further rotation of the wire material which is performed subsequent to the flow of FIG. 9, (a) is a view showing a seventh step, (b) is a view showing an eighth step, (c) is a view showing a ninth step, (d) is a view showing a tenth step, and (e) is a view showing an eleventh step.

As shown in FIG. 8(*a*), firstly, the knitting needle 61 (62, 63) is downwardly moved while hooking a first portion 71 of the wire material 8 which extends from the guiding member 64.

As shown in FIG. 8(*b*), after the knitting needle 61 (62, 63) is disengaged from the first portion 71 of the wire material 8, next, the knitting needle is upwardly moved while passing between parts of the first portion 71 which is bent so as to sandwich the knitting needle 61 (62, 63), and then hooks a second portion 72 of the wire material 8 that is newly guided.

As shown in FIG. 8(*c*), in the state where the knitting needle 61 (62, 63) hooks the second portion 72 of the wire material 8, next, the knitting needle is downwardly moved while passing between parts of the first portion 71 which is bent so as to sandwich the knitting needle 61 (62, 63). In this case, the knitting needle 61 (62, 63) is vertically moved while being revolvingly moved so as to pull a part of the wire material 8, and therefore an interlaced part of the wire material 8 is formed in the vicinity of the first portion 71 so that the stitch 7 is produced.

As shown in FIG. 8(d), after the knitting needle 61 (62, 63) is disengaged from the second portion 72 of the wire material 8, next, the knitting needle is upwardly moved while passing between parts of the second portion 72 which is bent so as to sandwich the knitting needle 61 (62, 63), and then hooks a third portion 73 of the wire material 8 that is newly guided.

As shown in FIG. 8(e), in the state where the knitting needle 61 (62, 63) hooks the third portion 73 of the wire material 8, next, the knitting needle is downwardly moved while passing between parts of the second portion 72 which is bent so as to sandwich the knitting needle 61 (62, 63). In this case, an interlaced part of the wire material 8 is formed in the vicinity of the second portion 72 so that the other stitch 7 will be newly produced.

Figure 11:
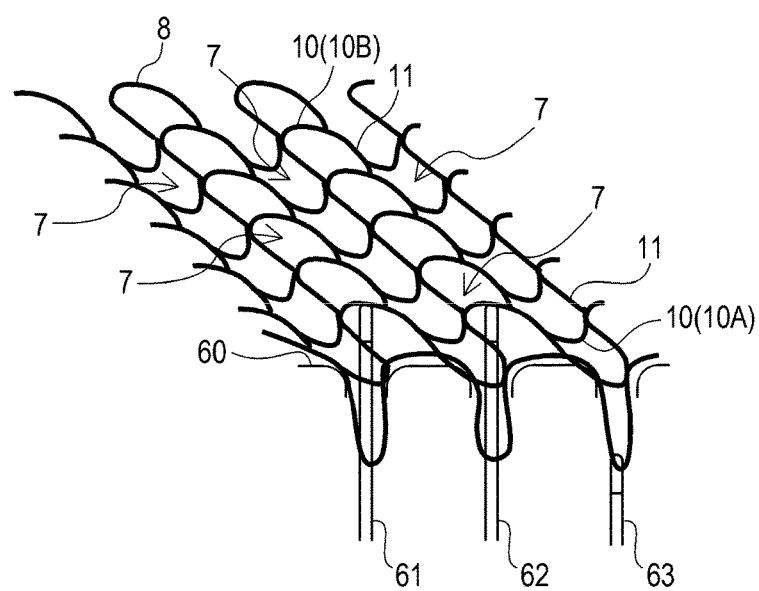
FIG. 11 is a schematic developed perspective view showing knitted a wire material.
Figure 12:
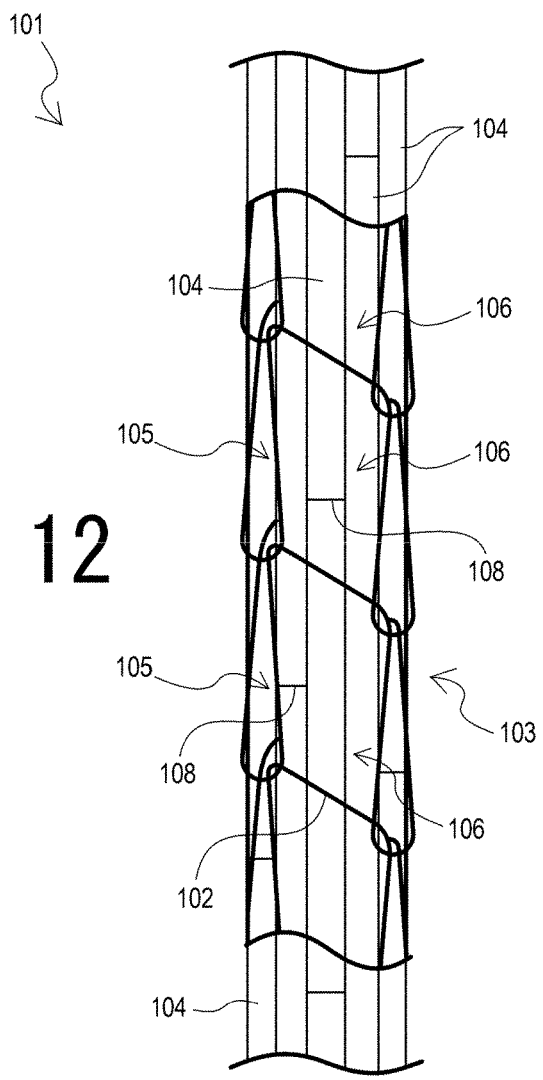
FIG. 12 is a partial front view of a conventional yarn.
Figure 13:
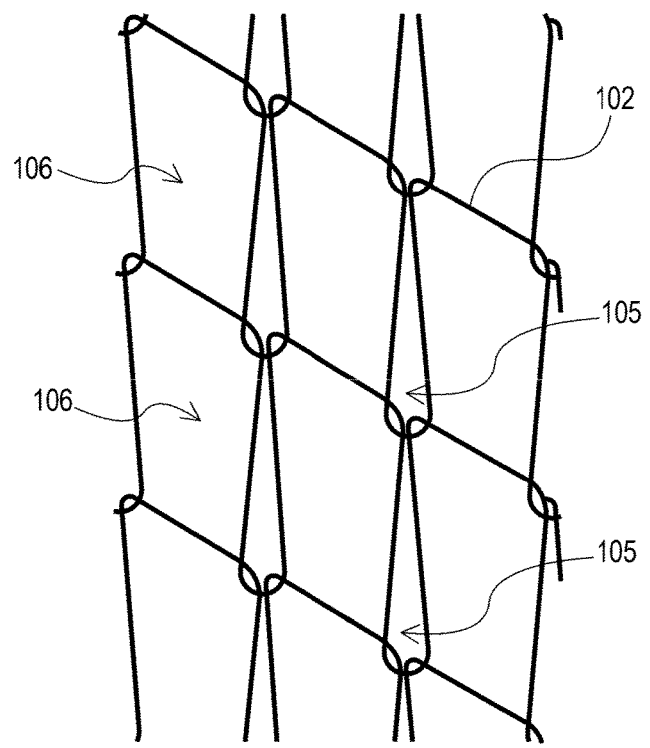
FIG. 13 is a partial development view of a tubular member in the yarn of FIG. 12.

In the knitting machine 35, in accordance with the rotation of the rotation table 60, these functions are sequentially performed by the knitting needles 61, 62, 63 as shown, for example, in FIGS. 9(a), 9(b), 9(c), 9(d), 9(e), and 9(f), and then 10(a), 10(b), 10(c), 10(d), and 10(e). As a result, as shown in FIG. 11, the stitches 7 are continuously produced, and the tubular member 5 which is a circular knitted structure having the stitches 7 can be obtained.

The knitting machine 35 is configured so that the drives of the components are controlled by a control device 76 (see FIG. 5). The control device 76 is configured so as to be able to control also the drives of the conveying mechanism 32 and cutting mechanism 33 in the manufacturing apparatus 30.

When the thus configured manufacturing apparatus 30 is used, the steps of the above-described method of manufacturing a yarn can be performed, and the yarn 1 can be manufactured.

Namely, the conveying step can be performed by using the supplying mechanism 31 and the conveying mechanism 32. The cutting step can be performed by using the cutting mechanism 33. The knitting step of the loading step can be performed by using the knitting machine 35. The guiding step and charging step of the loading step can be performed by using the guiding and supplying mechanism 34.

With respect to the loading step, particularly, the knitting step is performed. Therefore, the wire material 8 can be continuously knitted by using the knitting machine 35 by adequately vertically moving the plurality of knitting needles 61, 62, 63 while revolvingly moving the knitting needles 61, 62, 63 about the rotation axis 66 so that the tubular member 5 is formed. In accordance with the formation of the tubular member 5, consequently, the stitches 7 can be obtained.

In order to perform the guiding step, by using the funnel 55 of the guiding and supplying mechanism 34, the filler materials 6 which are introduced from the cutting mechanism 33 can be sequentially guided toward the opening which is shaped in the tubular member 5 that is in a middle stage of the formation in the knitting step, while changing the posture of the filler materials 6 from the horizontal posture to the vertical posture that extends in the axial direction of the tubular member 5.

In order to perform the charging step, by using the funnel 55 of the guiding and supplying mechanism 34, the filler materials 6 are sequentially charged into the tubular portion (a part of the tubular member 5) configured by the wire material 8 which is under knitting, in a state where the longitudinal direction of the filler material 6 extends in the axial direction (the vertical direction) of the tubular member 5, whereby the interior of the tubular member 5 is filled with the filler materials 6.

When the above-described method of manufacturing the yarn 1 is employed, the strip-like filler materials 6 are charged into the tubular member 5 in a middle stage of the formation of the tubular member. During the charging, then, a stress which may cause the stitches 7 to be inclined is continuously applied to the wire material 8 which is being knitted by the plurality of knitting needles 61, 62, 63 that are under revolving movement. That is, the wire material 8 receives a tensile force which may cause the inner diameter of the tubular member 5 to be reduced, and which is radially inwardly directed.

Therefore, the tubular member 5 exhibits a round tubular shape in which the stitches 7 are arranged in the axial direction of the tubular member 5, and spirally about the axis of the tubular member, and, while the filler materials 6 which are put into the tubular member 5 are compressingly enclosed by the wire material 8, the process of loading the filler materials 6 proceeds. When the filler materials 6 are configured by an easily deformable material (for example, expanded-graphite materials as in the embodiment), therefore, the loading density of the filler materials 6 in the tubular member 5 can be enhanced.

Even in the case where the filler materials 6 are relatively brittle, therefore, the motion in which the filler materials 6 try to slip off the stitches 7 can be suppressed. In the yarn 1 in which the filler materials 6 are loaded into the tubular member 5, consequently, the weight per unit length can be easily maintained substantially constant. As a result, it is possible to closely knit the yarns 1 to configure the gland packing 2 or the like.

Since the plurality of knitting needles 61, 62, 63 are placed substantially concentrically about the rotation axis 66 at approximately regular intervals, a stress which may cause the stitches 7 to be inclined is continuously applied to the wire material 8 which is being knitted, stresses applied to the wire material 8 are substantially uniform, and the stitches 7 are made substantially uniform in size in the whole tubular member 5. As a result, the stitches 7 having a size which may allow the longitudinal end portions of the filler materials 6 to be exposed as a whole are easily prevented from being produced.

DESCRIPTION OF REFERENCE NUMERALS 1 yarn
2 gland packing
5 tubular member
6 filler material
7 stitch
8 wire material
10 loop portion
12 straight line that extends in axial direction of tubular member

The invention claimed is:

1. A yarn which comprises a tubular member, and a plurality of filler materials that are formed into a strip-like shape, and in which the filler materials are loaded into the tubular member in a state where longitudinal directions of the filler materials are made extending along an axial direction of the tubular member, wherein the tubular member is configured by using a wire material, which is knitted so as to produce stitches, the wire material has arcuate loop portions, which define parts of external shapes of the stitches, and, in a state where the tubular member is developed, the loop portions are expanded in a direction that is inclined with respect to a straight line that extends in the axial direction of the tubular member.

2. The yarn according to claim 1, wherein the stitches are made substantially uniform in size.

3. The yarn according to claim 2, wherein the stitches are placed continuously in the axial direction of the tubular member, and spirally about an axis of the tubular member.

4. The yarn according to claim 2, wherein, in the tubular member, a sectional shape which is perpendicular to the axial direction of the tubular member is approximately circular.

5. The yarn according to claim 1, wherein the stitches are placed continuously in the axial direction of the tubular member, and spirally about an axis of the tubular member.

6. The yarn according to claim 5, wherein, in the tubular member, a sectional shape which is perpendicular to the axial direction of the tubular member is approximately circular.

7. The yarn according to claim 1, wherein, in the tubular member, a sectional shape which is perpendicular to the axial direction of the tubular member is approximately circular.

8. A gland packing which is configured into a string-like shape by twisting or braiding a plurality of bundled yarns, wherein the yarn according to claim 1 is included in the plurality of yarns.

* * * * *